Oct. 20, 1931.    W. VAN E. THOMPSON    1,827,961
SPRINKLER FOR NARROW AREAS
Filed Dec. 8, 1926
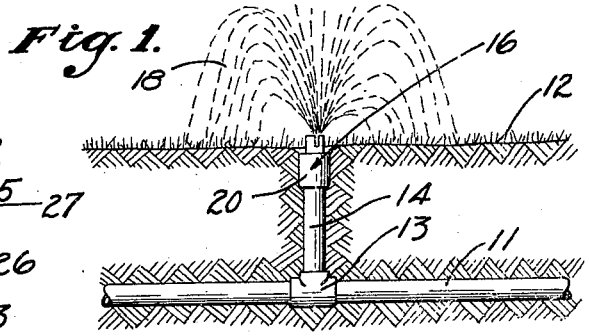
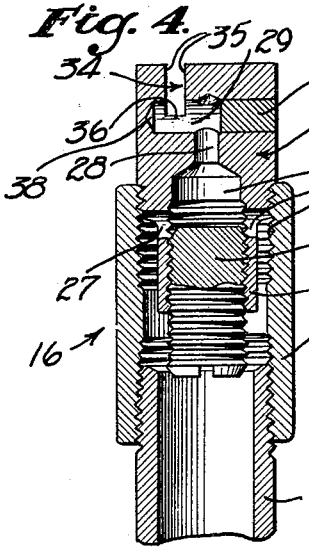
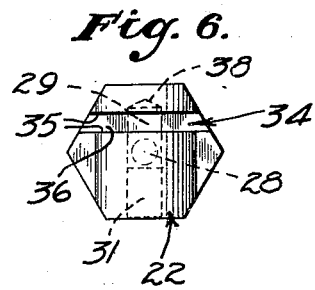
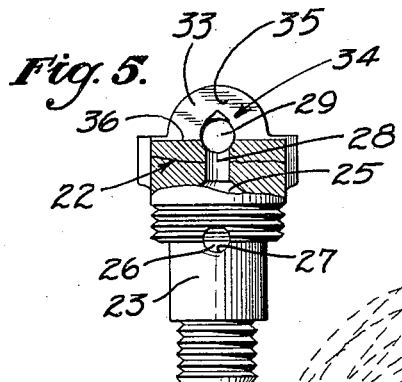
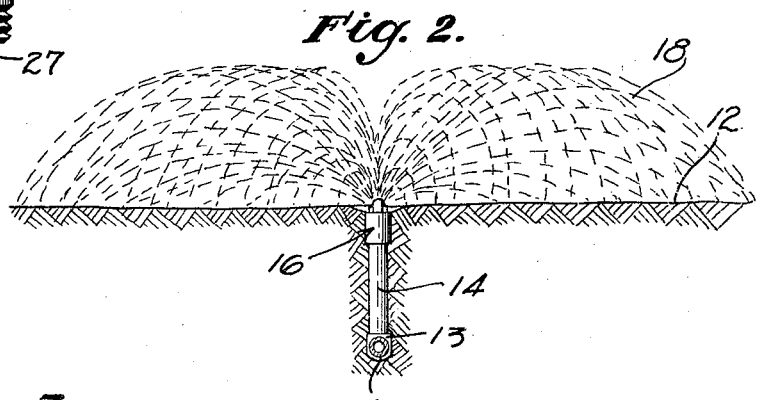
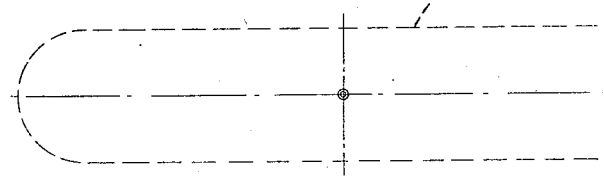
INVENTOR:
WALTER VAN E. THOMPSON
BY
ATTORNEY.

Patented Oct. 20, 1931

1,827,961

UNITED STATES PATENT OFFICE

WALTER VAN E. THOMPSON, OF LOS ANGELES, CALIFORNIA, ASSIGNOR TO THOMPSON MANUFACTURING COMPANY, OF LOS ANGELES, CALIFORNIA, A CORPORATION OF CALIFORNIA

SPRINKLER FOR NARROW AREAS

Application filed December 8, 1926. Serial No. 153,277.

My invention relates to a novel sprinkler for use in irrigation systems. It is common practice to provide areas to be irrigated, such as lawns, with irrigation systems. These irrigation systems consist of underground piping to which sprinklers located at the surface of the ground are connected. The entire area may be irrigated by merely operating a valve which controls the supply of water to the underground piping.

It is an object of this invention to provide a sprinkler which is adapted to irrigate a narrow elongated area.

If water issues from a sprinkler in a sheet, the wind resistance is very high and the stream will be blown considerably in the direction of the wind.

It is an object of my invention to provide a sprinkler of the character mentioned in which the stream is disrupted into drops so that it will have a low wind resistance.

Other objects and advantages of the invention will be made evident hereinafter.

Referring to the drawings in which I illustrate my invention:

Fig. 1 is a vertical section of the ground showing the use of the invention.

Fig. 2 is a similar section taken at right angles to Fig. 1.

Fig. 3 is a plan view of Fig. 2.

Fig. 4 is a vertical section through the sprinkler.

Fig. 5 is a view partly sectioned, this view being taken at right angles to Fig. 4.

Fig. 6 is a plan view of Fig. 5.

Referring to the drawings in detail and particularly Figs. 1 to 3 inclusive, 11 is a header which is extended somewhat below the surface of the ground 12. The header 11 is provided with T fittings 13, by means of which vertical pipes 14 are attached to the header. At the upper end of the pipes 14 are sprinkler heads 16 embodying the features of the invention. The sprinkler head of my invention is adapted to irrigate a narrow elongated area indicated by the dotted line 17 in Fig. 3. The streams produced by the invention are indicated by the numeral 18 in Figs. 1 and 2 and fall substantially as shown. It will be seen that the streams are formed of drops of water and do not form a single sheet which would have a high wind resistance. Fig. 1 is a view taken across the elongated area 17 whereas Fig. 2 is a view taken along the length of the elongated area 17.

The details of the sprinkler head 16 are shown in Figs. 4 to 6 inclusive. A sleeve 20 is secured to the upper end of each pipe 14. Each sleeve has internal threads 21 at the upper end thereof into which a body 22 is screwed. The lower part of the body 22 is provided in the from of a cylindrical projection 23 which extends from the main portion of the body 22 inside the sleeve 20. The cylindrical projection 23 is of smaller diameter than the internal diameter of the sleeve 20 so that an annular water passage is provided therearound. A threaded cavity 25 is formed in the cylindrical projection 23 and in the lower portion of the main part of the body 22, and screwed into the lower end of the cavity 25 is a valve in the form of a screw 26. Ducts 27 connect the cavity 25 to the annular space around the cylindrical projection 23 near the upper end thereof. The valve 26 may be adjusted in position to vary the effective size of the ducts 27. The upper end of the cavity 25 has an opening or supply passage 28 connected thereto. The opening 28 is of much smaller cross-sectional size than the cavity 25 and it is connected to a hole or vestibule 29. The hole 29 is cylindrical and is slightly larger in diameter than the opening 28. The hole 29 is drilled horizontally and at right angles to the opening 28, from one side of the body 22. The end of the hole 29 which connects to the exterior of the body 22 is filled with a plug 31. The upper end of the body 22 is provided in the form of a semi-cylindrical boss 33. Formed in this boss 33 to one side of the center of the body 22 is a dispersing slot or discharge mouth 34. The dispersing slot 34 is formed on a vertical plane at right angles to the hole 29, and it is vertically disaligned with respect to the opening 28. The dispersing slot 34 is defined by vertical spaced side walls 35 which are semi-cylindrical as illustrated best in Fig. 5, and a bottom horizontal wall 36. The dispersing slot 34 is connected to the hole 29 near the left end thereof. The bottom wall 36 is located in a plane above the lower part of the hole 29 and below the upper part thereof, preferably centrally between the upper and lower limits of the hole. The extreme left end of the hole 29 provides a disrupting pocket 38, whereas the other part of the hole 29 and the opening 28 form a passage. The part of the passage which connects to the slot 34 extends at substantially right angles to the slot as shown. The disrupting pocket 38 is on the opposite side of the slot 34 from the passage and is in alignment with the horizontal portion which connects to the slot 34.

In the operation of the invention the valve 26 is adjusted so that the proper amount of water will pass through the body 22. The water passes through the ducts 27, the upper part of the cavity 25, and into the passage which consists of the opening 28 and the hole 29. The hole 29 forms a sort of vestibule in which the water discharged from the opening 28 is given a high degree of turbulence before it is discharged through the dispersing slot, or discharge mouth, 34. This turbulence results partly from the fact that a stream of water from the opening 28 impacts against a blank wall of the vestible 29 and is forced to make a distinct change in the direction of its movement. This turbulence, however, mainly results from the fact that the cross-sectional area of the vestible 29 is larger than that of the opening 28 so that separation of the water from solid form into broken masses or particles takes place in the vestible 29. These particles of water are forced outward through the dispersing slot 34 with considerable violence. The side walls 35 prevent the particles of water from moving to the right or to the left of these walls with respect to Fig. 1 and Fig. 4, but since the ends are open the water is free to spread parallel to the direction of the walls 35. The result is that streams composed of particles of water indicated at 18 in Figs. 1 and 2 is provided. This is a very important feature of my invention since it enables an elongated area to be irrigated, using fewer sprinklers than the ordinary system. In the ordinary system the sprinklers do not provide an elongated stream and therefore the area of each sprinkler is limited so that a number of sprinklers having small irrigating areas must be placed side by side if an elongated strip is to be irrigated.

Another feature of this invention is that the streams will not be blown to any great extent even though there is a strong wind. This is because of the fact that the streams are broken up into particles so that the wind resistance is very low. Where the stream is in the form of a sheet the wind resistance is very high and would be blown considerably to one side in the direction of the wind so that the elongated area would not be irrigated and so that the water would be blown onto other portions which should not be supplied with water.

The directing of the water into the dispersing slot 34 at substantially right angles is important to the invention. The dispersing pocket 38 assists greatly in disrupting the stream of water into particles.

I claim as my invention:

1. In a turbulence sprinkler, the combination of: walls forming a vestibule chamber; walls forming a non-constrictive discharge mouth leading from said chamber to the atmosphere at an angle with the longitudinal axis of said chamber; and walls forming a supply passage connecting with said chamber, the cross-sectional area of said supply passage being sufficiently less than that of said chamber to set up a turbulence in said chamber, and the size of said mouth being sufficiently large that liquid broken up by said turbulence is discharged through said mouth in the form of drops, said mouth being a relatively long and narrow slot.

2. In a turbulence sprinkler, the combination of: walls forming a vestibule chamber; walls forming a non-constrictive discharge mouth leading from said chamber to the atmosphere; and walls forming a supply passage connecting with said chamber, the cross-sectional area of said supply passage being sufficiently less than that of said chamber to set up a turbulence in said chamber, and the size of said mouth being sufficiently large that liquid broken up by said turbulence is discharged through said mouth in the form of drops, said mouth and said passage being substantially parallel with each other.

3. In a turbulence sprinkler, the combination of: walls forming a vestibule chamber; walls forming a non-constrictive discharge mouth leading from said chamber to the atmosphere; and walls forming a supply passage connecting with said chamber, the cross-sectional area of said supply passage being sufficiently less than that of said chamber to set up a turbulence in said chamber, and the size of said mouth being sufficiently large that liquid broken up by said turbulence is discharged through said mouth in the form of drops, said mouth and said passage being offset relative to each other so that liquid after entering and before leaving said chamber is caused to make two substantially right angled changes in direction.

4. In a turbulence sprinkler, the combination of: walls forming a vestibule chamber; walls forming a non-constrictive discharge mouth leading from said chamber to the atmosphere; and walls forming a supply passage connecting with said chamber, the cross-sectional area of said supply passage being sufficiently less than that of said chamber to set up a turbulence in said chamber, and the size of said mouth being sufficiently large that liquid broken up by said turbulence is discharged through said mouth in the form of drops, said mouth and said passage being offset relative to each other so that liquid after entering and before leaving said chamber is caused to make two definite changes in direction.

In testimony whereof, I have hereunto set my hand at Los Angeles, Calif., this 3rd day of December, 1926.

WALTER VAN E. THOMPSON.